Feb. 18, 1947. E. D. TREANOR 2,416,130
ELECTRICAL INDUCTION APPARATUS AND PROTECTIVE MEANS THEREFOR
Filed April 27, 1944
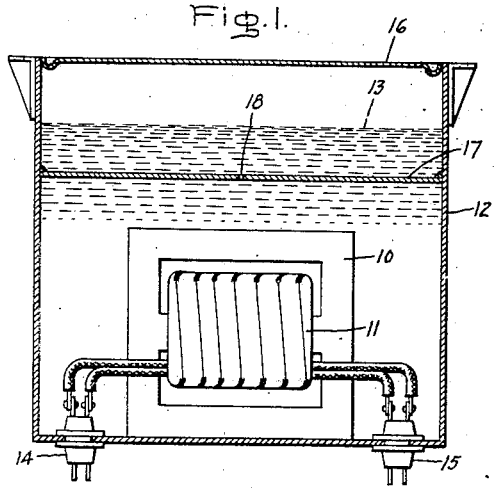
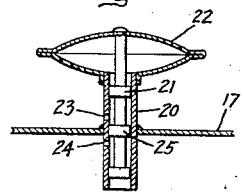
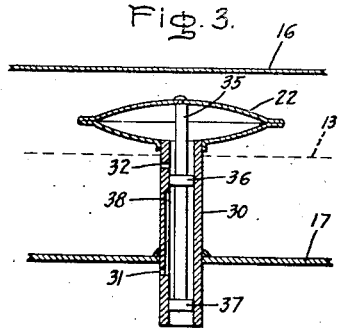
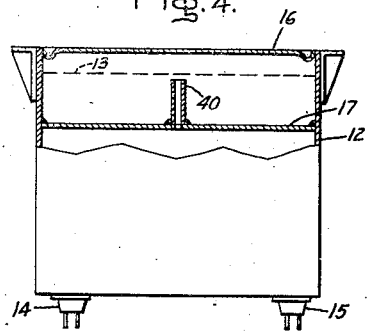
Inventor:
Edward D. Treanor,
by Harry E. Dunham
His Attorney.

Patented Feb. 18, 1947

2,416,130

UNITED STATES PATENT OFFICE 2,416,130

ELECTRICAL INDUCTION APPARATUS AND PROTECTIVE MEANS THEREFOR

Edward D. Treanor, Pittsfield, Mass., assignor to General Electric Company, a corporation of New York Application April 27, 1944, Serial No. 532,976

3 Claims. (Cl. 175—361)

My invention relates to electrical apparatus and to an electrical induction apparatus having an enclosing casing containing a dielectric liquid surrounding the core and coils thereof, and an expansion chamber above the level of the liquid.

It has been customary to manufacture electrical induction apparatus which are liquid filled with an enclosing casing and provide a gaseous space above the liquid to accommodate the expansion and contraction of the liquid. Thus either a separate expansion chamber may be placed on top of the main apparatus casing or the main apparatus casing may be only partially filled with liquid, the remainder of the space between the top of the liquid and the top of the casing being filled with a gas. However, with mobile apparatus which are susceptible to violent movement during operation, or being inverted, such as electrical apparatus on aircraft, it is possible with conventional structures that the gas volume may come in contact with the coils, thus causing the coils to arc-over.

It is therefore an object of my invention to provide an improved liquid filled electrical induction apparatus having a gaseous expansion space above the liquid which will minimize the possibility of the gas coming in contact with the coils.

It is a further object of my invention to provide a liquid filled electrical apparatus with an improved casing construction so as to prevent the gas in the top of the casing from coming in contact with the coils upon inversion of the casing.

Further objects and advantages of my invention will become apparent from the following description referring to the accompanying drawing, and the features of novelty which characterize my invention will be pointed out with particularity in the claims annexed to and forming a part of this specification.

In the drawing Fig. 1 is a sectional side elevation of a transformer which is provided with an embodiment of my invention; and Figs. 2, 3, and 4 illustrate modifications of the construction illustrated in Fig. 1.

Referring to Fig. 1 of the drawing, I have illustrated an electrical induction apparatus such as a transformer having a core 10 and a coil 11, which it is to be assumed may have primary and secondary windings. Surrounding the core and coils is casing 12 which is filled with a suitable dielectric liquid such as oil to any suitable amount such as to a normal level indicated by the dash line 13. Substantially liquid tight high and low voltage bushings 14 and 15 may be provided which are connected to the coil. The space between the top of the casing 16 and the level 13 of the liquid is filled with a suitable inert gas, such as nitrogen. It is to be understood that the gaseous space is proportioned to the amount of liquid so that during normal operation of the apparatus the pressure within the tank will be maintained within suitable limits.

In order to minimize the possibility of gas coming in contact with the coils when the casing is moved from the position as shown in Fig. 1 to a position toward being inverted, I provide a partition 17 which is placed at any suitable level below the minimum level of the liquid. Thus the partition 17 divides the casing 12 into two compartments, the lower one containing the core and coils and filled with the liquid and the upper one having a portion filled with liquid and the remainder filled with gas. In order to allow for the transfer of liquid to either side of the partition 17 during temperature changes, I provide an opening 18 in the partition. This opening is relatively small such as being about a tenth of an inch, so as to allow only a relatively slow transfer of liquid between the compartments of the casing.

In order to further minimize the transfer of either liquid or gas through the opening 18 I may provide a tube 20 as is shown in Fig. 2 in the partition 17 which tube contains a pressure operated valve arrangement. This valve includes a piston 21 which is held in the position as shown by a spring 22. In order to allow for transfer of fluid, openings 23 and 24 are provided in the tube on opposite sides of the partition. It will be seen in Fig. 2 that piston 21 is provided with a ring 25 between the openings 23 and 24 which ring substantially fills the bore of the tube so as to prevent transfer of fluid between the openings. Upon a differential of pressure occurring, the valve may be moved so that the ring 25 moves to one side or the other of the two openings 23 and 24 so as to allow transfer of liquid. Thus if the pressure on the lower side of the partition 17 becomes greater than the force of the spring 22, the piston will be pushed upwardly to a position with the ring 25 above the opening 23 so that the oil may pass out through the opening 23 into the space above the partition 17. However, when the pressure in the compartment above the partition 17 becomes greater it will force the piston downwardly, that is so that the ring 25 is placed below the opening 24, so as to allow movement of fluid in the opposite direction. It will be assumed that the spring is so designed that it will tend to maintain the piston valve in the position as is illustrated in Fig. 2.

In order to substantially prevent transfer of gas from the smaller compartment to the larger compartment which contains the core and coils, upon operation of the piston even when the casing is in an inverted position, I may employ a construction as is illustrated in Fig. 3. In this construction a tube 30 is provided in an opening in the partition 17 with an opening 31 below the partition, that is in the compartment containing the core and coils, and a second opening 32 above the partition, that is in the compartment containing the gas. The opening 32, however, is so positioned with respect to the partition 17 and the gas volume above the level of the liquid, that the opening 32 is below the normal liquid level but the distance of the opening 32 above the partition 17 is greater than the maximum height of the gas volume. Thus if the construction of Fig. 3 were placed in an inverted position, the gas could be accommodated in the space between the partition 17 and the opening 32 so that the opening 32 would be submerged in the liquid. A similar spring controlled piston valve 35 is provided having a ring 36 below the opening 32 and a ring 37 below the opening 31. When the pressure in the core and coil compartment becomes a predetermined amount it will force the piston 37 upwardly until the ring 36 moves to the opposite side of the opening 32. However the ring 37 is placed sufficiently below the opening 31 that the ring 37 will still be below the opening 31, and thus a passageway will be provided from the core and coil compartment to the openings 31 and 32 into the upper gas chamber. A groove 38 is placed in the inner wall of the tube 30 to a point below the normal position of the ring 36 so that when the pressure in the gas chamber becomes sufficiently greater than the pressure in the core and coil chamber, the ring 36 will be depressed until the top of the groove 38 may communicate with the opening 32 thus allowing transfer of liquid from the gas chamber to the core and coil chamber.

In the construction illustrated in Fig. 4 I have shown a tube 40 without the pressure control valve. The top of the tube is so positioned with respect to the gas volume that even though the casing is in an inverted position the end of the tube will still be submerged in the liquid. Thus even though the casing is in an inverted position the gas in the gas chamber will not bubble into the core and coil chamber and cause breakdown of the coil.

Although I have shown and described particular embodiments of my invention, I do not desire to be limited to the particular embodiments described, and I intend in the appended claims to cover all modifications which do not depart from the spirit and scope of my invention.

What I claim as new and desire to secure by Letters Patent of the United States is:

1. In an electrical apparatus, a core and coil, a substantially fluid tight casing enclosing said core and coil, a dielectric liquid within said casing and having a normal level above the top of said core and coil and below the top of said casing, a gas in the space between the top of said casing and the liquid, a partition in said casing above said core and coil and below the normal level of said liquid so as to minimize the possibility of gas coming in contact with said coil during movement of said casing, said partition having an opening so as to permit expansion and contraction of liquid to either side of said partition, and means including valve means in said opening for preventing transfer of gas through said opening when said casing is placed in an inverted position.

2. In an electrical apparatus, a core and coil, a substantially fluid tight casing enclosing said core and coil, a dielectric liquid within said casing and having a normal level above the top of said core and coil and below the top of said casing, a gas in the space between the top of said casing and the liquid, a partition in said casing above said core and coil and below the normal level of said liquid so as to minimize the possibility of gas coming in contact with said coil during movement of said casing, said partition having an opening so as to permit expansion and contraction of liquid to either side of said partition, and means including valve means in said opening for preventing transfer of gas through said opening when said casing is placed in an inverted position and for permitting movement of liquid through said opening upon a differential of pressure being present between the fluid on opposite sides of said partition 3. In an electrical apparatus, a core and coil, a substantially fluid tight casing enclosing said core and coil, a dielectric liquid within said casing and having a normal level above the top of said core and coil and below the top of said casing, a gas in the space between the top of said casing and the liquid, a partition in said casing above said core and coil and below the normal level of said liquid so as to minimize the possibility of gas in contact with said coil during movement of said casing, said partition having an opening, tube means within said opening, said tube means having openings on opposite sides of said partition, and means including valve means within said tube and between said openings for preventing transfer of fluid through said openings, said valve means being movable upon a predetermined differential of pressure being present between the fluid on opposite sides of said partition so as to allow movement of fluid through said openings in said tube.

EDWARD D. TREANOR.

REFERENCES CITED

The following references are of record in the file of this patent:

UNITED STATES PATENTS

| Number | Name | Date |
| --- | --- | --- |
| 1,437,232 | Frank | Nov. 28, 1922 |
| 1,599,245 | Pornin | Sept. 7, 1926 |
| 1,534,749 | Troy | Apr. 21, 1925 |
| 1,135,103 | Fortescue | Apr. 13, 1915 |

FOREIGN PATENTS

| Number | Country | Date |
| --- | --- | --- |
| 572,878 | French | Feb. 29, 1924 |
| 267,775 | German | Nov. 29, 1913 |
| 743,765 | French | Jan. 16, 1933 |
| 700,636 | German | Dec 24, 1940 |
| 527,486 | German | June 18, 1931 |